US012720269B2

(12) United States Patent
Fernandez Franco et al.

(10) Patent No.: US 12,720,269 B2
(45) Date of Patent: Aug. 25, 2026

(54) DISTRIBUTION OF AUDIO SIGNALS FOR VIRTUAL SOUND SOURCES

(71) Applicant: HARMAN INTERNATIONAL INDUSTRIES, INCORPORATED, Stamford, CT (US)

(72) Inventors: Alfredo Fernandez Franco, Los Angeles, CA (US); Jason Riggs, Northridge, CA (US); Christopher Michael Trestain, Livonia, MI (US); Anton Matushkin, Budapest (HU)

(73) Assignee: Harman International Industries, Incorporated, Stamford, CT (US)

( * ) Notice: Subject to any disclaimer, the term of this patent is extended or adjusted under 35 U.S.C. 154(b) by 323 days.

(21) Appl. No.: 18/520,422

(22) Filed: Nov. 27, 2023

(65) Prior Publication Data

US 2025/0175755 A1 May 29, 2025

(51) Int. Cl.
*H04S 7/00* (2006.01)
*A63H 5/00* (2006.01)
*H04R 5/02* (2006.01)

(52) U.S. Cl.
CPC ............... *H04S 7/302* (2013.01); *A63H 5/00* (2013.01); *H04R 5/02* (2013.01); *A63H 2200/00* (2013.01); *H04S 2400/11* (2013.01); *H04S 2400/13* (2013.01); *H04S 2400/15* (2013.01)

(58) Field of Classification Search
CPC ........ H04S 7/30; H04S 7/302; H04S 2400/11; H04S 2400/13; H04S 2400/15; A63F 13/54; A63H 5/00; A63H 2200/00; H04R 5/02
USPC .......................................................... 381/303
See application file for complete search history.

(56) References Cited

U.S. PATENT DOCUMENTS 10,126,823 B2 11/2018 Nahman et al.
10,265,621 B2 4/2019 Goslin et al.
2010/0197401 A1 8/2010 Altshuler et al.
2015/0334504 A1* 11/2015 Donaldson ............ G06F 3/0346 381/307
2019/0289418 A1 9/2019 Jang
2020/0112813 A1 4/2020 Sanger et al.
(Continued)

FOREIGN PATENT DOCUMENTS

WO 202247455 A1 12/2022

OTHER PUBLICATIONS

Muller et al. ("The BoomRoom: Mid-air Direct Interaction with Virtual Sound Sources", Proceedings of the Sigchi Conference on Human Factors In Computing Systems, DOI: 10.1145/2556288.2557000, Apr. 26-May 1, 2014) (Year: 2014).*
(Continued)

*Primary Examiner* — Paul Kim
(74) *Attorney, Agent, or Firm* — Artegis Law Group, LLP

(57) ABSTRACT

In various embodiments, a computer-implemented method comprises determining a loudspeaker position of a loudspeaker in a listening environment, tracking an object position of an object within the listening environment, retrieving an audio signal, computing a distance between the object position and the loudspeaker position, generating a modified audio signal, wherein an amplitude of the modified audio signal is based on (i) the audio signal, (ii) the distance, and (iii) a distance attenuation function, and transmitting the modified audio signal to the loudspeaker.

15 Claims, 3 Drawing Sheets

(56) References Cited

U.S. PATENT DOCUMENTS

| | | | |
|---|---|---|---|
| 2021/0289297 A1 | 9/2021 | Souviraa-Labastie et al. | |
| 2021/0352428 A1* | 11/2021 | Prospero | H04S 7/303 |

OTHER PUBLICATIONS

Start, Evert Walter, "Direct Sound Enhancement by Wave Field Synthesis", XP055013192, 1997, 114 pages.
Müller et al., "The BoomRoom: Mid-air Direct Interaction with Virtual Sound Sources", Proceedings of the Sigchi Conference on Human Factors In Computing Systems, DOI: 10.1145/2556288. 2557000, Apr. 26-May 1, 2014, pp. 247-256.

* cited by examiner

DISTRIBUTION OF AUDIO SIGNALS FOR VIRTUAL SOUND SOURCES

BACKGROUND

Field of the Various Embodiments

The various embodiments relate generally to audio output devices and, more specifically, to distribution of audio signals for virtual sound sources.

Description of the Related Art

Various consumer devices output sound to enhance the user experience when interacting with the consumer device. For example, various products produce sound to entertain users. In such products, a sound-producing circuit stores a pre-recorded sound file or generates sounds to be output. When the product receives an input, such as a button press, the sound-producing circuit loads the pre-recorded sound file or generates the sound and drives a speaker to output corresponding audio.

At least one drawback of conventional sound producing devices is that such devices have limited ability to play immersive sounds. For example, some devices use low-power microcontrollers or storage systems to minimize costs; however, the limited storage and processing capacity of such systems limits the device to reproducing sound using speakers with a limited set of parameters. As a result, the sounds produced by the conventional sound producing devices have difficulty reproducing the timbre of a prerecorded sound or a generated sound. In addition, many devices are not capable of producing sounds or lack the ability to be updated to output new or different sounds.

In response to the above limitations of such devices, it is often desirable to output the audio associated with the device through a separate sound system, such as groups of speakers. The speakers are often positioned at certain locations within a physical space. For example, a given room includes a soundbar and additional satellite speakers positioned proximate to the soundbar. In another example, a room can include speakers that are organized as a home theater, where a center speaker is positioned near the center of a front wall of the room, and front left, front right, rear left, and rear right speakers are each positioned in a corresponding corner of the room. An audio playback device transmits a signal to each speaker so that a listener within the physical space hears the combined output of all of the speakers, hearing the sound associated with the sound producing device.

At least one drawback of conventional sound systems is that such systems are not responsive to the position or movement of the device within a listening environment that is associated with the sound being produced. For example, the speakers within a given sound system generate a sound field that includes one or more sweet spots corresponding to a target location for a listener to be positioned in the listening environment. In the sound field, the sweet spots are generally tuned to yield desirable sound quality. However, because the sound system does not account for the location of the speakers and the device that is associated with the sound. As a result, the listener may perceive that the apparent location of the sound being produced by the sound system is different from the device which is "generating" the sound. The incongruity between the actual location of the device and the apparent location of the produced sound degrades the immersive experiences that the listener experiences.

As the foregoing illustrates, what is needed in the art are more effective techniques for providing audio from multiple speakers that have changed position.

SUMMARY

In various embodiments, a computer-implemented method comprises determining a loudspeaker position of a loudspeaker in a listening environment, tracking an object position of an object within the listening environment, retrieving an audio signal, computing a distance between the object position and the loudspeaker position, generating a modified audio signal, wherein an amplitude of the modified audio signal is based on (i) the audio signal, (ii) the distance, and (iii) a distance attenuation function, and transmitting the modified audio signal to the loudspeaker.

Further embodiments provide, among other things, non-transitory computer-readable storage media storing instructions for implementing the method set forth above, as well as an interactive toy, a device, and a system configured to implement the method set forth above.

At least one technical advantage of the disclosed technique relative to the prior art is that using the disclosed techniques, sound systems can distribute audio signals to one or more loudspeakers in a physical listening area in manner that indicates an apparent location of an object within the listening environment with improved perceptual accuracy with respect to timbre and localization. In particular, by determining the position of an object within the listening environment and attenuating sound signals based on distances between the object and the respective one or more loudspeakers, the sound system provide perceptually accurate sounds for tracked objects in real-time, thus efficiently providing realistic, immersive audio in a listening environment that is responsive to the movements of an object within the listening environment without requiring large and expensive processing resources. Further, by using a technique that operates with various quantities of loudspeakers, a sound system using the disclosed techniques can provide perceptually accurate audio that is responsive to the differing quantities of loudspeakers positioned at various locations within the listening environment. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
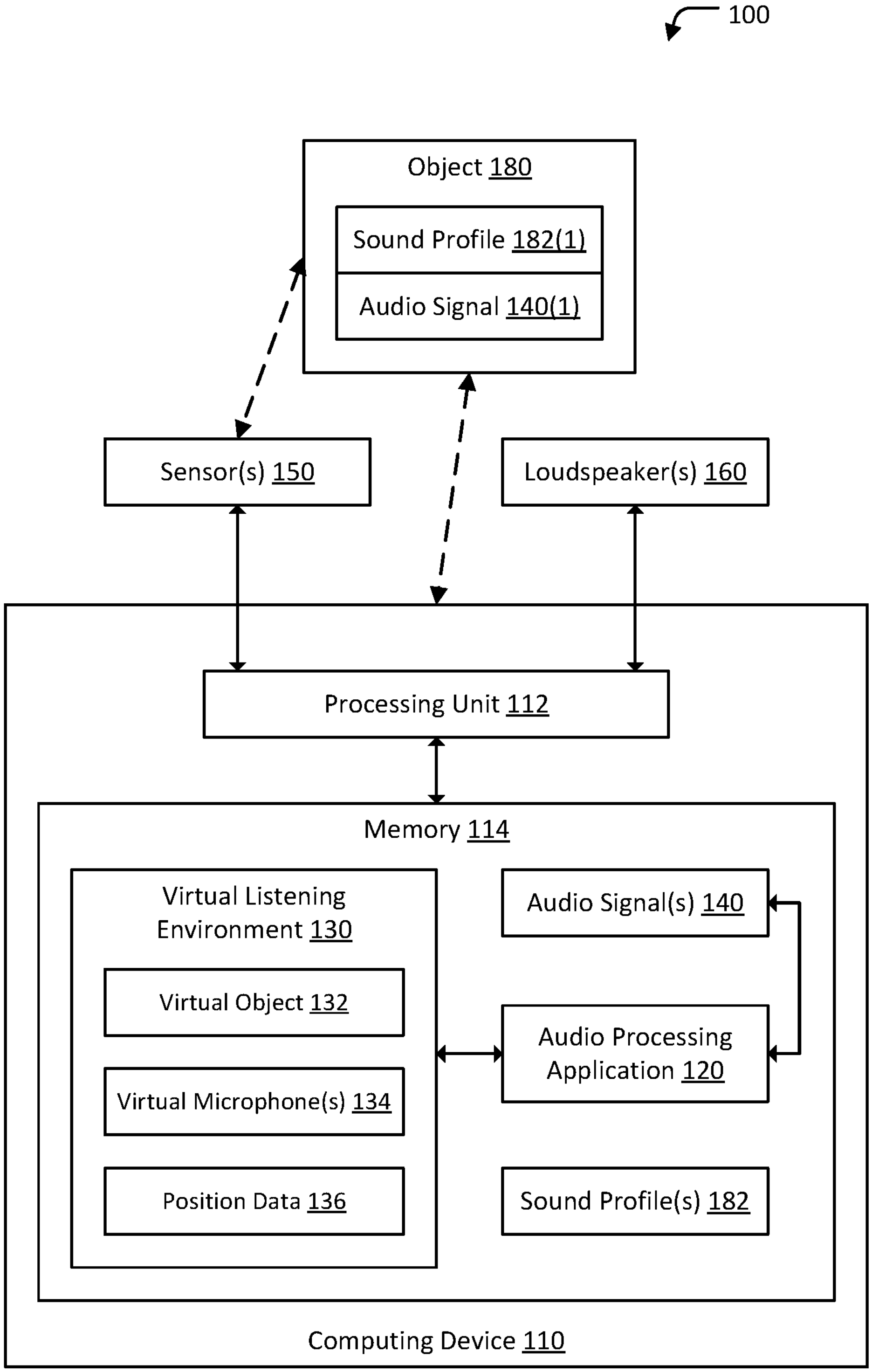
FIG. 1 is a schematic diagram illustrating an audio processing system in accordance with various embodiments.

FIG. 1 is a schematic diagram illustrating the audio processing system 100 in accordance with various embodiments. As shown, the audio processing system 100 includes, without limitation, a computing device 110, one or more sensors 150, and one or more loudspeaker(s) 160. The computing device 110 includes, without limitation, a processing unit 112 and a memory 114. The memory 114 includes, without limitation, an audio processing application 120, a virtual environment 130, one or more audio signals 140, and one or more sound profiles 182. The virtual environment 130 includes, without limitation, a virtual object 132, one or more virtual microphone(s) 134, and position data 136. The object 180 includes, without limitation, a sound profile 182(1) and an audio signal 140(1).

The audio processing system 100 can be implemented in various forms, such as an interactive device including a processor and local memory, personal computers, and so forth. For example, the audio processing system 100 can be incorporated in one or more interactive toys (e.g., a bird toy including a voice box). Additionally or alternatively, in some embodiments, the audio processing system 100 can be incorporated into other types of non-toy consumer devices. The audio processing system 100 can perform the processing functions using a dedicated processing device and/or a separate computing device, such as a mobile computing device of a user or a cloud computing system. The audio processing system 100 can detect various environmental values using any number of sensors of various types, which can be attached to, integrated with other system components, or disposed separately.

The computing device 110 is a device that generates audio signals to drive one or more loudspeakers 160 to generate, in part, a sound field. In various embodiments, the computing device 110 transmits a set of modified audio signals to the set of loudspeakers 160 in the audio processing system 100. In various embodiments, the computing device 110 can be a central unit in a home theater system, a soundbar, and/or another device that communicates with the one or more loudspeakers 160. The computing device 110 is included in one or more devices, such as consumer products (e.g., interactive toys, portable speakers, gaming devices, gambling products, etc.), smart home devices (e.g., smart lighting systems, security systems, digital assistants, etc.), communications systems (e.g., conference call systems, video conferencing systems, speaker amplification systems, etc.), and so forth. In various embodiments, the computing device 110 is located in various environments including, without limitation, indoor environments (e.g., living room, conference room, conference hall, home office, etc.), and/or outdoor environments, (e.g., patio, rooftop, garden, etc.). In some embodiments, the computing device 110 is a low-power, limited processing, and/or limited memory device that implements a lightweight processing of incoming data. For example, the computing device 110 could be a Raspberry Pi (e.g., Pi 1®, Pi 2®, Pi 3®, or Pi 4®) that includes a processor such as a digital signal processor, memory (e.g., 1-4 MB RAM), and storage (e.g., a flash storage card). For example, the computing device 110 could be a development board, such as a Teensey® 4.0 microcontroller development board, or any other board that contains a processor that is used as a digital signal processor, such as an ARM® Cortex M4, or other lightweight computing devices.

The processing unit 112 can be any suitable processor, such as a central processing unit (CPU), a graphics processing unit (GPU), an application-specific integrated circuit (ASIC), a field programmable gate array (FPGA), a digital signal processor (DSP), a multicore processor, and/or any other type of processing unit, or a combination of two or more of a same type and/or different types of processing units, such as a system on a chip (SoC), or a CPU configured to operate in conjunction with a GPU. In general, the processing unit 112 can be any technically feasible hardware unit capable of processing data and/or executing software applications.

The memory 114 can include a random-access memory (RAM) module, a flash memory unit, or any other type of memory unit or combination thereof. The processing unit 112 is configured to read data from and write data to memory 114. In various embodiments, the memory 114 includes non-volatile memory, such as optical drives, magnetic drives, flash drives, or other storage. In some embodiments, separate data stores, such as an external device included in a network ("cloud storage") supplements the memory 114. The audio processing application 120 within memory 114 can be executed by the processing unit 112 to implement the overall functionality of the computing device 110, including the audio processing application 120 and/or running simulations and solvers associated with the virtual environment 130 and, thus, to coordinate the operation of the computing device 110 as a whole. In various embodiments, an interconnect bus (not shown) connects the processing unit 112, the memory 114, and any other components of the computing device 110.

The audio processing application 120 determines the relative distance of the object 180 to the one or more loudspeakers 160 and generates audio signals for a set of loudspeakers 160 to reproduce. The audio processing application 120 generates the audio signals by first determining the relative positions (e.g., location and/or orientation) of the object 180 and the set of loudspeakers 160 and computing distances between the object and the set of loudspeakers 160. The audio processing application 120 uses the respective computed distances to generate a set of modified audio signals that are at least adjusted as a function of the computed distances. The audio processing application 120 then transmits the set of modified set of audio signals to the set of loudspeakers 160 for reproduction.

In various embodiments, the audio processing application 120. determines the current position of each loudspeaker in the set of loudspeakers 160 within a physical listening environment. Additionally or alternatively, the audio processing application 120 tracks the movement of one or more loudspeakers in the set of loudspeakers 160. For example, the audio processing application 120 receives sensor data (e.g., tracking data for a given loudspeaker as a series of optical data, and/or a series of auditory data received in response to test signals generated by the computing device 110) from the one or more sensors 150. In such instances, the sensor data indicates the location and/or orientation of each loudspeaker 160 at a given time. In some embodiments, the sensor data indicates that at least one loudspeaker (e.g., the loudspeaker 160(4)) of the set of loudspeakers 160 is moving. The audio processing application processes the sensor data to determine the respective positions of the set of loudspeakers 160 and causes the computing device 110 to store the determined positions as portions of the position data 136 in a common coordinate system. In some embodiments, the audio processing application 120 receives sensor data generated by one or more sensors on the loudspeaker 160(4). For example, the loudspeaker 160 can include one or more sensors (not shown), such as position sensors and/or an IMU that acquires various sensor data (e.g., acceleration measurements, magnetic field measurements, angular rates, etc.). In such instances, the loudspeaker acquires sensor data while moving and transmits a sequence of messages containing the acquired sensor data. In such instances, the audio processing application 120 receives and aggregates the sensor data included in messages and determines the trajectory and/or current position of the loudspeaker 160.

In various embodiments, the audio processing application 120 tracks the position of the object 180. In some embodiments, the object 180 is a physical object within a physical listening environment 210. In such instances, the audio processing application 120 determines the position of the physical object 180 within the physical listening environment and/or tracks the trajectory of the physical object 180 moving through the physical listening environment. In one example, the audio processing application 120 acquires sensor data from the one or more sensors 150 determines the current position of the physical object 180 by processing the acquired sensor data. The computing device 110 then stores each determined position in the common coordinate system as a portion of the position data 136. Alternatively, in some embodiments, the object 180 is a virtual object 132 within the virtual environment 130. In such instances, the audio processing application 120 tracks the virtual object 132 within the virtual environment 130 based on the position data 136 generated for the virtual object 132. For example, the audio processing application 120 and/or a separate application (not shown) generates the virtual environment 130 that includes the virtual object 132. In such instances, the application managing the virtual environment 130 generates the position data for the virtual object 132. In such instances, the audio processing application 120 tracks the virtual object 132 as the virtual object moves through the virtual environment 130 by retrieving the portion of the position data 136 corresponding to the virtual object 132.

In various embodiments, the audio processing application 120 computes a set of distances from the object 180 to the set of loudspeakers 160. In some embodiments, the audio processing application 120 computes physical distances (e.g., Euclidean distances) from the object 180 to each loudspeaker 160(1)-160(5) in a physical listening environment to generate the computed distances. Additionally or alternatively, in some embodiments, the audio processing application 120 computes distances from the virtual object 132 to a set of virtual microphones 134 within the virtual environment 130 to generate the computed distances. For example, the virtual environment 130 includes a set of virtual microphones 134 at positions within the virtual environment 130 that correspond to the positions of the set of loudspeakers 160 within the physical listening environment. The audio processing application 120 computes distances between the virtual object 132 and the virtual microphones 134 that represents the Euclidean distances between the object 180 and the set of loudspeakers 160 within the physical listening environment.

In various embodiments, the audio processing application 120 generates audio signals for the loudspeakers 160 based on a set of computed distances and one or more distance attenuation functions. In various embodiments, the audio processing application 120 uses one or more distance attenuation functions to modify the amplitude and/or phase of an input audio signal 140(1) to generate audio signals for the set of loudspeakers based on the respective computed distances between the respective loudspeakers 160 and the object 180. Additionally or alternatively, the audio processing application 120 uses other functions to modify the input audio signal 140(1) based on the orientation of the respective loudspeakers 160 relative to the object 180. In some embodiments, the audio processing application 120 also applies various panning techniques to an input audio signal 140(1) to simulate the sound of the object 180 as the object 180 moves along the trajectory 222.

In some embodiments, the physical listening environment does not include a physical object. In such instances, the audio processing application 120 tracks the trajectory of a virtual object 132 within the virtual environment 130 based on the position data 136 generated for the virtual object 132. In such instances, the position of the virtual object 132 within the virtual environment 130 represents where a physical object (e.g., the object 180) would be within a physical listening environment. For example, the audio processing application 120 and/or a separate application (not shown) generates the virtual object 132 (e.g., a virtual ball in an AR game) within the virtual environment 130. In such instances, the application managing the virtual environment 130 also generates position data for the virtual object 132. In such instances, the audio processing application 120 tracks the virtual object 132 using the position data corresponding to the virtual object 132 and computes the distances between the position of the virtual object 132 and the positions of the virtual microphones 134.

In various embodiments, the audio processing application 120 selects a distance attenuation function from a set of candidate distance attenuation functions. For example, the computing device 110 can store a set of candidate distance attenuation functions, such as a linear function, a linear-squared function, or an inverse function, that attenuates the gain or changes the phase of the input audio signal 140(1) as a function of the distance between the object 180 and a given loudspeaker 160. In such instances, the audio processing application 120 uses the selected distance attenuation function to modify the amplitude and/or phase of an input audio signal for the given loudspeaker 160 based on the computed distances between the given loudspeaker 160 and the object 180. In some embodiments, the distance attenuation function attenuates the audio signal between a minimum distance ($D_{min}$) and a maximum distance ($D_{max}$). In such instances, the audio processing application 120 compares a computed distance to a minimum distance threshold ($D_{min}$) based on the minimum distance (e.g., zero or some other minimum distance) and/or a maximum distance threshold based on the maximum distance ($D_{max}$). When the audio processing application 120 determines that the computed distance satisfies the minimum threshold and/or the maximum threshold, the audio processing application 120 applies the selected distance attenuation function.

In one example, the audio processing application 120 uses a linear function that attenuates the amplitude of a given signal as a function of the distance (D) between the object 180 and the loudspeaker 160 (or the virtual object 132 and the virtual microphone 134). The linear function can also modify the amplitude outside the minimum and maximum thresholds. For example, equation 1 computes the amplitude based on the value of the computed distance 262 compared to the minimum and maximum thresholds:

$$A(D) = \begin{cases} 0 & D \geq D_{max} \\ 1 - \frac{D - D_{min}}{D_{max} - D_{min}} & D_{min} \leq D < D_{max} \\ 1 & D < D_{min} \end{cases} \quad \text{Equation 1}$$

In another example, the audio processing application 120 uses a linear-squared function that attenuates the amplitude of a given signal as a function of a square of the distance (D), where the amplitude attenuates as the distance increases. The linear-squared function can also modify the amplitude outside the minimum and maximum thresholds. For example, the piecemeal equation 2 computes the amplitude based on the value of the computed distance 262 compared to the minimum and maximum thresholds:

$$A(D) = \begin{cases} 0 & D \geq D_{max} \\ \frac{(D - D_{max})^2}{(D_{min} - D_{max})^2} & D_{min} \leq D < D_{max} \\ 1 & D < D_{min} \end{cases} \quad \text{Equation 2}$$

In further examples, the audio processing application 120 uses an inverse function that the amplitude of a given signal is a function an inverse of the distance (D), attenuating as the distance increases. The inverse function can also modify the amplitude outside the minimum and maximum thresholds. For example, the piecemeal equation 3 computes the amplitude based on the value of the computed distance 262 compared to the minimum and maximum thresholds:

$$A(D) = \begin{cases} D_{min}/D_{max} & D \geq D_{max} \\ D_{min}/D & D_{min} \leq D < D_{max} \\ 1 & D < D_{min} \end{cases} \quad \text{Equation 3}$$

Some embodiments, the audio processing application 120 uses, in addition to the inverse function, a taper that gradually attenuates the amplitude of a given signal as the distance exceeds the maximum threshold to a taper point (T). For example, the piecemeal equation 4 computes the amplitude based on the value of the computed distance 262 compared to the minimum and maximum thresholds, as well as a taper point (e.g. 4*($D_{max}$–$D_{min}$)):

$$A(D) = \begin{cases} 0 & D \geq D_{max} + T \\ \frac{D_{min}}{D_{max}} * (D - D_{max} - T)^2 / T^2 & D_{max} \leq D < D_{max} + T \\ D_{min}/D & D_{min} \leq D < D_{max} \\ 1 & D < D_{min} \end{cases} \quad \text{Equation 4}$$

Additionally or alternatively, in some embodiments, the audio processing application 120 uses distance attenuation functions that further modify the amplitude and/or phase based on a computed difference in orientation. In such instances, the computed amplitude is a function of the distance (D) and one or more angles representing the difference in orientation, as shown in Equation 5:

$$A = f(D, \mu, \varphi, \psi) \quad \text{Equation 5}$$

In various embodiments, the audio processing application 120 drives the computing device 110 to transmit the set of modified audio signals to the set of loudspeakers 160. In some embodiments, each of the respective loudspeakers in the set of loudspeakers 160 receives one of the modified audio signals from the computing device 110 via a wire, a wireless stream, or via a network. Upon reception of the modified audio signal, the each loudspeaker 160 in the set loudspeakers 160 reproduces a respective modified audio signal to generate soundwaves within the physical listening environment. In various embodiments, the soundwaves that the set of loudspeakers 160 generates combine to generate a sound field that provides a perceptually accurate location of the object 180 within the physical listening environment.

The virtual environment 130 is a computer model that simulates operations and physics within a virtual acoustic environment, as well as the operation of one or more virtual devices in the virtual acoustic environment. In some embodiments, an application managing the virtual environment 130 (e.g., the audio processing application 120, a separate application, etc.) is trained with data simulating measurement data recorded in a test acoustic environment.

The virtual object 132 and the one or more virtual microphone(s) 134 represent objects and/or devices within the physical listening environment. For example, the virtual object 132 represents the object 180 and the one or more virtual microphones 134 represents the one or more loudspeakers 160. In various embodiments, the audio processor uses the virtual object 132 and/or the virtual microphones 134 to compute distances used to generate the set of modified audio signals. For example, the audio processing application 120 can initially determine the positions of the loudspeakers 160(1)-160(5) within the physical listening environment 210. The audio processing application 120 can use the reciprocity principle of sound to swap positions of audio emitters and audio receivers within the virtual environment 130. In such instances, the audio processing application 120 places a set of virtual microphones 134(1)-134(5) at positions within the virtual environment 130 that correspond to the positions of the loudspeakers 160(1)-160(5) within the physical listening environment 210. Additionally or alternatively, the audio processing application 120 simulates the physical object 180 as a virtual object 132 that acts as an audio emitter. In such instances, the audio processing application 120 places the virtual object 132 at a position within the virtual environment 130 that corresponds to the position of the physical object 180 within the physical listening environment 210. When the audio processing application 120 computes distances between the virtual object 132 and the virtual microphones 134(1)-134(5), the computed distances 262(1)-262(5) within the virtual environment 130 correspond to the computed distances 262(1)-262(5) between the physical object 180 and the loudspeakers 160(1)-160(5) within the physical listening environment 210.

In various embodiments, the positions of the virtual object 132 and/or the set of virtual microphones 134 are represented in in the form of a combination of the location and orientation. For example, the position data 136 for a given virtual microphone 134 includes coordinates for the location of the virtual microphone within the virtual environment 130, as well as orientation information, such as a set of angles (e.g., {μ, φ, ψ}) relative to a normal orientation within the virtual environment 130.

The memory 114 stores one or more audio signals 140 and one or more sound profiles 182. For example, the computing device 110 receives the sound profile 182(1) containing the input audio signal 140(1) from the object 180 and stores the sound profile 182(1) in the memory 114. In some embodiments, the audio processing application 120 receives the input audio signal 140(1) separately from the sound profile 182(1). Additionally or alternatively, in some embodiments, the computing device 110 stores one or more sound profiles 182 and or one or more audio signals 140 associated with a plurality of objects. In such instances, the audio processing application 120 identifies the object 180, identifies the sound profile 182(1) corresponding to the object 180, and retrieves the audio signal 140(1) associated with the sound profile 182(1).

The object 180 is a physical object within a physical listening environment or an object representing the position of the virtual object 132 within the physical listening environment. In various embodiments, the audio processing application 120 tracks the object 180 within the physical listening environment and generates a set of audio signals associated with the object 180. For example, the object 180 can be an interactive toy (e.g., an ambulance) that stores an audio signal (e.g., a siren). In such instances, the audio processing application 120 tracks the current position of the interactive toy within the physical listening environment and generates a set of audio signals for the set of loudspeakers 160 to reproduce the sounds of the interactive toy.

In some embodiments, the object 180 includes a set of tracking sensors (not shown) usable to determine the position and/or movement of the object 180 within the physical listening environment. For example, the object 180 can include various types of tracking sensors, such as optical sensors, position sensors, IMUs, audio sensors, and so forth, that acquire sensor data. In such instances, the object sends the sensor data in one or more messages to the audio processing application 120 for processing to determine the position of the object 180. Additionally or alternatively, the object 180 stores a sound profile 182(1) and/or an audio signal 140(1). In various embodiments, the computing device 110 acquires the sound profile 182(1) and/or the audio signal 140(1) from the object 180 and stores the sound profile 182(1) and/or the audio signal 140(1). In such instances, the audio processing application 120 can subsequently identify the object 180 and retrieve the sound profile 182(1) and/or the audio signal 140(1) in order to generate the set of audio signals for reproduction by the set of loudspeakers 160.

The one or more sensor(s) 150 include various types of sensors that acquire sensor data from the physical listening environment. For example, the sensors 150 can include auditory sensors, such as microphones, to receive types of sound (e.g., subsonic pulses, ultrasonic sounds, speech commands, etc.). In some embodiments, the sensors 150 include optical sensors, such as RGB cameras, time-of-flight cameras, infrared cameras, depth cameras, a quick response (QR) code tracking system, potentiometers, proximity or presence sensors, motion sensors, such as an accelerometer or an inertial measurement unit (IMU) (e.g., a three-axis accelerometer, gyroscopic sensor, and/or magnetometer), pressure sensors, and so forth. In addition, in some embodiments, the sensors 150 can include wireless sensors, including radio frequency (RF) sensors (e.g., sonar and radar), and/or wireless communications protocols, including Bluetooth, Bluetooth low energy (BLE), cellular protocols, and/or near-field communications (NFC).

The one or more loudspeaker(s) 160 each provide a sound output by reproducing a respective received audio signal. For example, the one or more loudspeakers 160 could be components of a wired or wireless speaker system, or any other device that generates a sound output. In various embodiments, the two or more loudspeakers 160 can be incorporated into a speaker array and/or a single device (e.g., disposed in the body of a form factor including the multiple loudspeakers) and share a common location. In various embodiments, the one or more loudspeakers are implemented using any number of different conventional form factors, such as a single consumer product, discrete loudspeaker devices, personal speakers, body-worn (head, shoulder, arm, etc.) speaker devices, and so forth. In some embodiments, the one or more loudspeakers 160 can be connected to output devices that additionally provide other forms of outputs, such as display devices that provide visual outputs.

Figure 2:
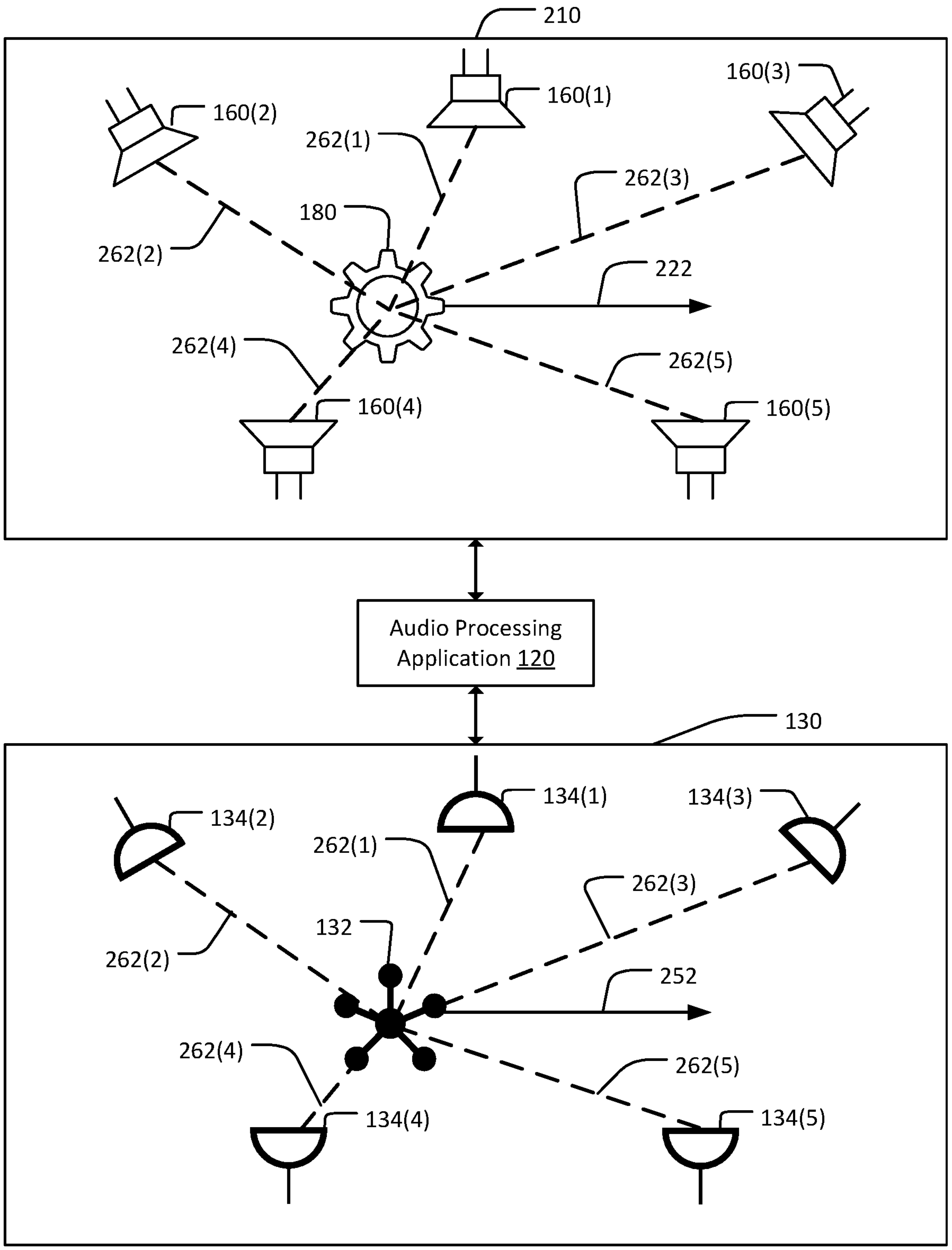
FIG. 2 illustrates an example physical listening environment and corresponding virtual listening environment modeled by the audio processing system of FIG. 1, according to various embodiments.

FIG. 2 illustrates an example physical listening environment 210 and corresponding virtual listening environment 130 modeled by the audio processing system 100 of FIG. 1, according to various embodiments. As shown, the physical listening environment 210 includes, without limitation, a set of loudspeakers 160 and a physical object 180. The virtual environment 130 includes, without limitation, a set of virtual microphones 134 and a virtual object 132.

In operation, the audio processing application 120 determines the positions of the loudspeakers 160(1)-160(5) in the physical listening environment 210. The audio processing application 120 uses the determined positions to compute distances 262(1)-262(5) between the physical object 180 and the loudspeakers 160(1)-160(5). The audio processing application 120 uses the computed set of distances 262 to modify a set of audio signals that the loudspeakers 160(1)-160(5) reproduce within the physical listening environment 210. When generating the audio signal for a given loudspeaker (e.g., the loudspeaker 160(2)), the audio processing application 120 modifies an input audio signal 140(1) using a distance attenuation function that modifies the amplitude and/or phase of the input audio signal 140(1) as a function of the computed distance 262(2). In this manner, the audio processing application 120 drives the loudspeakers 160(1)-160(2) to produce, in real-time, a sound field that includes perceptually accurate sounds for the physical object 180 that is responsive to the movements of the physical object 180 without requiring large and expensive processing resources.

The physical listening environment 210 is a portion of a real-world environment that includes one or more loudspeakers 160 that reproduce audio signals that a listener hears. In various embodiments, the physical listening environment 210 can include various quantities of loudspeakers 160. In such instances, the audio processing application 120 tracks each of the loudspeakers 160 within the physical listening environment 210 and distributes audio signals to each of the loudspeakers 160.

In various embodiments, the physical listening environment 210 includes at least one physical object 180. In such instances, the audio processing application 120 tracks the physical object 180 and generates a set of audio signals associated with the physical object 180, where the loudspeakers 160 reproduce the set of audio signals to generate a sound field that includes a sound corresponding to the physical object 180. For example, the physical object 180 can be an interactive toy (e.g., an ambulance) that stores an audio signal (e.g., a siren). In such instances, the audio processing application 120 tracks the current position of the interactive toy within the physical listening environment 210 and generates a set of audio signals for the loudspeakers 160 to reproduce. The loudspeakers 160 reproduce the set of audio signals, generating a sound field that provides the audio signal for the interactive toy in a manner that provides a perceptually accurate representation (e.g., accurate timbre, localization, etc.) of the position of the interactive toy within the physical listening environment 210.

In various embodiments, the audio processing application 120 tracks the movement of one or more of the loudspeakers 160(1)-160(5) within the physical listening environment 210. In such instances, the audio processing application 120 receives from the one or more sensors 150 the sensor data indicating the location and/or orientation of each loudspeaker 160(1)-160(5) at a given time. In some embodiments, the sensor data indicates that at least one loudspeaker (e.g., the loudspeaker 160(2)) is moving. In one example, the audio processing application 120 acquires sensor data in the form of tracking data that includes a series of optical data acquired by optical sensors, and/or a series of auditory data received by one or more microphones in response to test signals generated by the computing device 110. The audio processing application 120 processes the tracking data to determine the current position of each loudspeaker 160(1)-160(5), where the position includes a location and orientation. For example, the position the loudspeaker 160(2) includes coordinates for the location of the loudspeaker 160(2) within the physical listening environment 210, as well as orientation information, such as a set of angles (e.g., $\{\mu, \varphi, \psi\}$) relative to a normal orientation within the physical listening environment 210. Additionally or alternatively, in some embodiments, the audio processing application 120 receives sensor data generated by position sensors and/or an IMU (e.g., acceleration measurements, magnetic field measurements, angular rates, etc.) on the loudspeaker 160(2). For example, the loudspeaker 160(2) while moving transmits a sequence of messages containing the sensor data. In such instances, the audio processing application 120 receives and aggregates the sensor data included in messages and determines the trajectory and/or current position of the loudspeaker 160(2).

In various embodiments, the audio processing application 120 tracks the trajectory 222 of the physical object 180 within the physical listening environment 210. For example, the audio processing application 120 processes sensor data received from the one or more sensors 150 to detect the presence of the physical object 180 within the physical listening environment 210. In such instances, the audio processing application 120 determines the current position of the physical object 180 and/or tracks the trajectory 222 of the physical object 180 within the physical listening environment 210. The computing device 110 then stores each determined position as a portion of the position data 136, in the form of a combination of the location and orientation.

In various embodiments, the audio processing application 120 tracks the positions of the loudspeakers 160(1)-160(5) and/or the physical object 180 using the virtual environment 130. In some embodiments, the audio processing application 120 generates the virtual environment 130 as a virtual simulation of the physical listening environment 210. Alternatively, in some embodiments, a separate application (not shown), such as an augmented reality (AR), virtual reality (VR), and/or extended reality (XR) application generates the virtual environment 130. In such instances, the audio processing application 120 uses the virtual environment 130 to compute distances 262 within the virtual environment 130 and use the computed distances 262 when generating the audio signals for the loudspeakers 160(1)-160(5).

For example, the audio processing application 120 can initially determine the positions of the loudspeakers 160(1)-160(5) within the physical listening environment 210. The audio processing application 120 can use the reciprocity principle of sound to swap positions of audio emitters and audio receivers within the virtual environment 130. In such instances, the audio processing application 120 places a set of virtual microphones 134(1)-134(5) at positions within the virtual environment 130 that correspond to the positions of the loudspeakers 160(1)-160(5) within the physical listening environment 210. Additionally or alternatively, the audio processing application 120 simulates the physical object 180 as a virtual object 132 that acts as an audio emitter. In such instances, the audio processing application 120 places the virtual object 132 at a position within the virtual environment 130 that corresponds to the position of the physical object 180 within the physical listening environment 210. When the audio processing application 120 computes distances between the virtual object 132 and the virtual microphones 134(1)-134(5), the computed distances 262(1)-262(5) within the virtual environment 130 correspond to the computed distances 262(1)-262(5) between the physical object 180 and the loudspeakers 160(1)-160(5) within the physical listening environment 210.

In various embodiments, the audio processing application 120 generates audio signals for the loudspeakers 160 based on the computed distances 262(1)-262(5) and one or more distance attenuation functions. In various embodiments, the audio processing application 120 uses the one or more distance attenuation functions to modify the amplitude and/or phase of an input audio signal 140(1) to generate audio signals for each loudspeaker 160(1)-160(5) based on the respective computed distances 262(1)-262(5) between the loudspeakers 160 and the tracked object. Additionally or alternatively, the audio processing application 120 uses other functions to modify the input audio signal 140(1) based on the orientation of the loudspeaker 160 relative to the physical object 180. In some embodiments, the audio processing application 120 also applies various panning techniques to an audio signal 140(1) corresponding to the physical object 180 to simulate the sound of the physical object 180 as the physical object 180 moves along the trajectory 222.

Alternatively, in some embodiments, the physical listening environment 210 does not include the physical object 180. In such instances, the audio processing application 120 tracks the trajectory 252 of a virtual object 132 within the virtual environment 130 based on the position data 136 generated for the virtual object 132. For example, the audio processing application 120 and/or a separate application (not shown) generates the virtual object 132 (e.g., a virtual ball in an AR game). In such instances, the application managing the virtual environment 130 also generates position data for the virtual object 132 as the virtual object 132 traverses along the trajectory 252. In such instances, the audio processing application 120 tracks the virtual object 132 using the position data corresponding to the virtual object 132 and computes the distances 262(1)-262(5) between the position of the virtual object 132 and the positions of the virtual microphones 134(1)-134(5).

Figure 3:
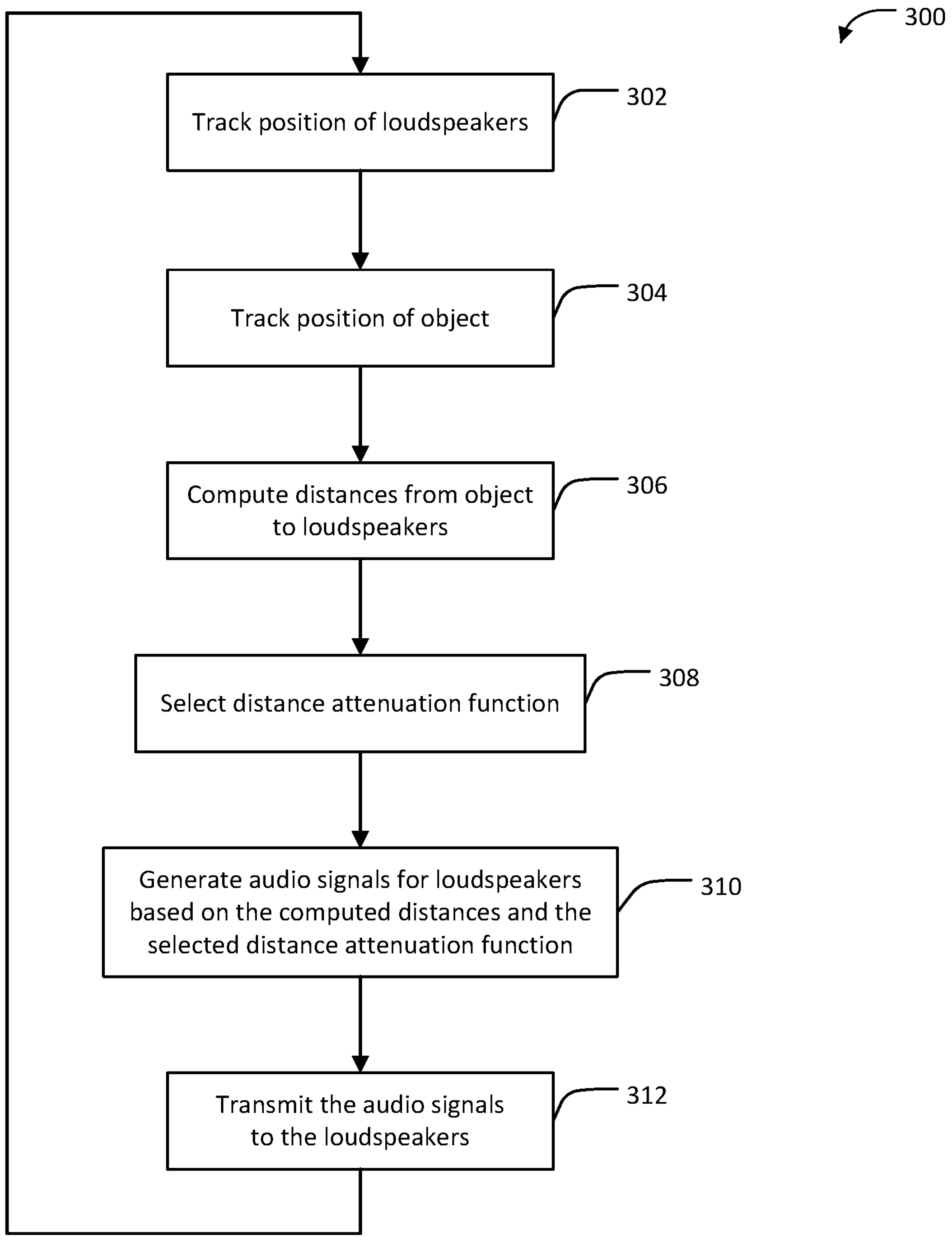
FIG. 3 sets forth a flow chart of method steps for generating audio signals based on the position of a tracked object, according to various embodiments.

FIG. 3 sets forth a flow chart of method steps for generating audio signals based on the position of a tracked object, according to various embodiments. Although the method steps are described with reference to the systems of FIGS. 1-2, persons skilled in the art will understand that any system configured to implement the method steps, in any order, falls within the scope of the present disclosure.

As shown, the method 300 begins at step 302, where the audio processing application 120 tracks a set of one or more loudspeakers 160. In various embodiments, the audio processing application 120 executing on the computing device

110 tracks the movement of a set of loudspeakers 160 (e.g., the loudspeakers 160(1)-160(5)) within a physical listening environment 210. Additionally or alternatively, in various embodiments, the audio processing application 120 determines the current position of each loudspeaker in the set of loudspeakers 160. In various embodiments, the audio processing application 120 receives sensor data from one or more sensors 150 coupled to the computing device 110, where the sensor data indicates the location and/or orientation of each loudspeaker 160 at a given time. In some embodiments, the sensor data indicates that at least one loudspeaker (e.g., the loudspeaker 160(4)) of the set of loudspeakers 160 is moving.

In one example, the audio processing application 120 acquires sensor data from the one or more sensors 150 coupled to the computing device 110 (e.g., tracking data for a given loudspeaker 160 as a series of optical data, and/or a series of auditory data received in response to test signals generated by the computing device 110). In some embodiments, the computing device 110 determines the current position of each loudspeaker of the set of loudspeakers 160 from the sensor data. The computing device 110 then stores each determined position as a portion of the position data 136, in the form of a combination of the location and orientation. For example, the position data 136 for a given loudspeaker 160(4) includes coordinates for the location of the loudspeaker 160(4) within the physical listening environment 210, as well as orientation information, such as a set of angles (e.g., {μ, φ, ψ}) relative to a normal orientation within the physical listening environment 210.

Additionally or alternatively, in some embodiments, the audio processing application 120 receives sensor data generated by position sensors and/or an IMU (e.g., acceleration measurements, magnetic field measurements, angular rates, etc.) on the loudspeaker 160(4). For example, the loudspeaker 160(4) while moving transmits a sequence of messages containing the sensor data. In such instances, the audio processing application 120 receives and aggregates the sensor data included in messages and determines the trajectory and/or current position of the loudspeaker 160.

At step 304, the audio processing application 120 tracks the position of an object. In various embodiments, the audio processing application 120 tracks the position of an object 180 within a listening environment. In some embodiments, the object is a physical object 180 within a physical listening environment 210. In such instances, the audio processing application 120 determines the position of the physical object 180 within the physical listening environment 210 and/or tracks the trajectory 222 of the physical object 180. In one example, the audio processing application 120 acquires sensor data from the one or more sensors 150 coupled to the computing device 110 and determines the current position of the object 180 from the sensor data. The computing device 110 then stores each determined position as a portion of the position data 136, in the form of a combination of the location and orientation.

Alternatively, in some embodiments, the object is a virtual object 132 within a virtual environment 130 corresponding to the physical listening environment 210 that includes the loudspeakers 160. In such instances, the audio processing application 120 can track the trajectory 252 of the virtual object 132 within the virtual environment 130 based on the position data 136 generated for the virtual object 132. For example, the audio processing application 120 and/or an XR application (not shown) generates the virtual environment 130 that includes the virtual object 132. In such instances, the application managing the virtual environment 130 generates the position data for the virtual object 132 as the virtual object 132 traverses along the trajectory 252. In such instances, the audio processing application 120 tracks the virtual object 132 by retrieving the portion of the position data 136 corresponding to the virtual object 132.

At step 306, the audio processing application 120 computes distances from the tracked object to the loudspeakers 160. In various embodiments, the audio processing application 120 computes a set of distances between the position of each loudspeaker of the set of loudspeakers 160 and the tracked object. In some embodiments, the audio processing application 120 computes physical distances (e.g., Euclidean distances) from the physical object 180 to each loudspeaker 160(1)-160(5) in the physical listening environment 210 to generate the computed distances 262(1)-262(5).

Additionally or alternatively, in some embodiments, the audio processing application 120 computes distances from the virtual object 132 to a set of virtual microphones 134(1)-134(5) within the virtual environment 130 to generate the computed distances 262(1)-262(5). For example, the virtual environment 130 includes a set of virtual microphones 134 at positions within the virtual environment 130 that correspond to the positions of the set of loudspeakers 160 within the physical listening environment 210. For example, the position of the virtual microphone 134(4) within the virtual environment 130 corresponds to the position of the loudspeaker 160(4) within the physical listening environment 210. Consequently, the computed distance 262(4) between the virtual object 132 and the virtual microphone 134(4) represents the Euclidean distance between the object (either the virtual object 132 or the physical object 180) and the loudspeaker 160(4) within the physical listening environment 210.

At step 308, the audio processing application 120 selects a distance attenuation function. In various embodiments, the audio processing application 120 selects a distance attenuation function from a set of candidate distance attenuation functions to use when generating a set of audio signals for the set of loudspeakers 160. In various embodiments, the audio processing application 120 applies the computed distance for a given loudspeaker using the distance attenuation function to modify the amplitude and/or phase of an input audio signal when generating an audio signal for the given loudspeaker to reproduce. For example, the computing device 110 can store a set of candidate distance attenuation functions, such as a linear function, a linear-squared function, or an inverse function that attenuates the gain or changes the phase of the input audio signal as a function of the distance between the tracked object and the given loudspeaker.

At step 310, the audio processing application 120 generates audio signals for the loudspeakers 160 based on the computed distances 262 and the selected distance attenuation function. In various embodiments, the audio processing application 120 uses the selected distance attenuation function to modify the amplitude and/or phase of an input audio signal for each loudspeaker 160(1)-160(5) based on the respective computed distances 262(1)-262(5) between the loudspeakers 160 and the tracked object.

In some embodiments, the audio processing application 120 receives the input audio signal 140(1) used for generating the audio signals from the object 180. For example, the computing device 110 receives a sound profile 182(1) containing the input audio signal 140(1) from the object 180 and stores the sound profile 182(1) in the memory 114. In some embodiments, the audio processing application 120 receives the input audio signal 140(1) separately from the sound profile 182(1). Additionally or alternatively, in some embodiments, the computing device 110 stores one or more sound profiles 182 and or one or more audio signals 140 associated with a plurality of objects. In such instances, the audio processing application 120 identifies the object 180, identifies the sound profile 182(1) corresponding to the object 180, and retrieves the audio signal 140(1) associated with the sound profile 182(1).

In various embodiments, upon retrieving the input audio signal 140(1), the audio processing application 120 generates a set of modified audio signals for the set of loudspeakers 160 by modifying the input audio signal 140(1) using the selected distance attenuation function. For example, the audio processing application 120 generates a modified audio signal for the loudspeaker 160(4) by modifying the amplitude of the input audio signal 140(1) by applying the selected distance attenuation function. The distance attenuation function modifies the amplitude of the input audio signal 140(1) as a function of the computed distance 262(4) such that the amplitude of the modified audio signal decreases as the computed distance 262(4) between the object and the loudspeaker 160(4) increases.

In some embodiments, the distance attenuation function attenuates the audio signal between a minimum distance and a maximum distance. In such instances, the audio processing application 120 compares the computed distance 262(4) to a minimum distance threshold and/or a maximum distance threshold. When the audio processing application 120 determines that the computed distance 262(4) satisfies the threshold(s), the audio processing application 120 applies the selected distance attenuation function.

At step 312, the audio processing application 120 transmits the modified audio signals to the loudspeakers 160. In various embodiments, the audio processing application 120 drives the computing device 110 to transmit the set of modified audio signals to the set of loudspeakers 160. In some embodiments, each of the respective loudspeakers in the set of loudspeakers 160 receives one of the modified audio signals from the computing device 110 via a wire, a wireless stream, or via a network. Upon reception of the modified audio signal, the loudspeaker 160 reproduces the modified audio signal to generate soundwaves within physical listening environment 210. In various embodiments, the soundwaves that the set of loudspeakers 160 generates combine to generate a sound field that provides a perceptually accurate location of the object 180 within the physical listening environment 210.

Upon transmitting the audio signals to the set of loudspeakers 160, the audio processing application 120 returns to step 302 or 304 to optionally track any additional movement by the object 180 and/or the one or more loudspeakers in the set of loudspeakers 160. For example, the audio processing application 120 returns to step 302 to detect movement of the loudspeaker 160(1) to a new location within the physical listening environment 210. In such instances, the audio processing application 120 repeats at least a portion of the method 300 to compute the distance between the object 180 and the loudspeaker 160(1) at the new position. Alternatively, the audio processing application 120 proceeds to step 304 to track the trajectory 222 of the object 180 and repeats the method 300 to compute the distances between the object 180 at the new position and the set of loudspeakers 160.

In sum, an audio processing application tracks the locations of one or more loudspeakers within a physical listening environment. The audio processing application identifies the locations of the loudspeakers in a corresponding virtual listening environment and places virtual microphones at the identified locations. The audio processing application also tracks one or more objects within the physical listening environment. The audio processing application identifies the locations of the one or more objects in the corresponding virtual listening environment and places virtual sound sources at the identified locations. In some embodiments, the audio processing application determines, for each loudspeaker, a distance between the location of the object and the location of the loudspeaker. In some embodiments, the virtual sound source of is a virtual object within the virtual listening environment. In some embodiments, the audio processing application determines, for each loudspeaker, a distance between the location of the virtual sound source and the location of the virtual microphone corresponding to the loudspeaker within the virtual listening environment.

Upon determining the distances, the audio processing application then generates audio signals for each loudspeaker based on the respective distances. When generating the audio signals, the audio processing application determines the amplitude of a given audio signal for the loudspeaker based on the determined distance to the virtual sound source and a distance attenuation function. The audio processing application then distributes the audio signals to the respective loudspeakers for reproduction in the physical listening environment.

At least one technical advantage of the disclosed technique relative to the prior art is that using the disclosed techniques, sound systems can distribute audio signals to one or more loudspeakers in a physical listening area in manner that indicates an apparent location of an object within the listening environment with improved perceptual accuracy with respect to timbre and localization. In particular, by determining the position of an object within the listening environment and attenuating sound signals based on distances between the object and the respective one or more loudspeakers, the sound system provide perceptually accurate sounds for tracked objects in real-time, thus efficiently providing realistic, immersive audio in a listening environment that is responsive to the movements of an object within the listening environment without requiring large and expensive processing resources. Further, by using a technique that operates with various quantities of loudspeakers, a sound system using the disclosed techniques can provide perceptually accurate audio that is responsive to the differing quantities of loudspeakers positioned at various locations within the listening environment. These technical advantages provide one or more technological improvements over prior art approaches.

1. In various embodiments, a computer-implemented method comprises determining a loudspeaker position of a loudspeaker in a listening environment, tracking an object position of an object within the listening environment, retrieving an audio signal, computing a distance between the object position and the loudspeaker position, generating a modified audio signal, wherein an amplitude of the modified audio signal is based on (i) the audio signal, (ii) the distance, and (iii) a distance attenuation function, and transmitting the modified audio signal to the loudspeaker.

2. The computer-implemented method of clause 1, where the object is a physical object within the listening environment.

3. The computer-implemented method of clause 1 or 2, where the object is an interactive toy.

4. The computer-implemented method of any of clauses 1-3, where determining the loudspeaker position for the loudspeaker comprises tracking the loudspeaker.

5. The computer-implemented method of claim any of clauses 1-4, where the distance attenuation function comprises at least one of: a linear function, a linear-squared function, or an inverse function.

6. The computer-implemented method of any of clauses 1-5, where the loudspeaker position includes a location and an orientation, and the amplitude of the modified audio signal is further based on the orientation of the loudspeaker relative to the object.

7. The computer-implemented method of any of clauses 1-6, further comprising determining, for each additional loudspeaker of one or more additional loudspeakers in the listening environment, an additional loudspeaker position, and for each additional loudspeaker of the one or more additional loudspeakers computing an additional distance between the object position and the additional loudspeaker position, generating an additional modified audio signal, where an amplitude of the additional modified audio signal is based on (i) the audio signal, (ii) the additional distance, and (iii) the distance attenuation function, and transmitting the additional modified audio signal to the additional loudspeaker.

8. The computer-implemented method of any of clauses 1-7, where the loudspeaker is a speaker array.

9. The computer-implemented method of any of clauses 1-8, where retrieving the audio signal comprises receiving, from the object, a sound profile that includes the audio signal.

10. The computer-implemented method of any of clauses 1-9, where retrieving the audio signal comprises identifying the object, and loading the audio signal from a sound profile corresponding to the object.

11. In various embodiments, one or more non-transitory computer-readable media store instructions that, when executed by one or more processors, cause the one or more processors to perform the steps of determining a loudspeaker position of a loudspeaker in a listening environment, tracking an object position of an object within the listening environment, retrieving an audio signal, computing a distance between the object position and the loudspeaker position, generating a modified audio signal, wherein an amplitude of the modified audio signal is based on (i) the audio signal, (ii) the distance, and (iii) a distance attenuation function, and transmitting the modified audio signal to the loudspeaker.

12. The one or more non-transitory computer-readable media of clause 11, further comprising generating, in a virtual environment corresponding to the listening environment, one or more virtual microphones, where each virtual microphone corresponds to a loudspeaker of the one or more loudspeakers, and each virtual microphone is at a microphone position within the virtual environment corresponding to the loudspeaker position within the listening environment.

13. The one or more non-transitory computer-readable media of clause 11 or 12, where the object is a virtual object within the virtual environment.

14. The one or more non-transitory computer-readable media of any of clauses 11-13, where determining the loudspeaker position for the loudspeaker comprises tracking the loudspeaker.

15. The one or more non-transitory computer-readable media of any of clauses 11-14, where the loudspeaker position includes a location and an orientation, and the amplitude of the modified audio signal is further based on the orientation of the loudspeaker relative to the object.

16. The one or more non-transitory computer-readable media of any of clauses 11-15, where retrieving the audio signal comprises identifying the object, and loading the audio signal from a sound profile corresponding to the object.

17. In various embodiments, an interactive toy that generates audio signals for reproduction, comprising at least one sensor that acquires sensor data, and a computing device that determines, a loudspeaker position of a loudspeaker in a listening environment, tracks, based on the sensor data, an object position for the interactive toy within the listening environment, retrieves an audio signal, computes a distance between the object position and the loudspeaker position, generates a modified audio signal, where an amplitude of the modified audio signal is based on (i) the audio signal, (ii) the distance, and (iii) a distance attenuation function, and transmits the modified audio signal to the loudspeaker.

18. The interactive toy of clause 17, where determining the loudspeaker positions for each loudspeaker of the one or more loudspeakers comprises tracking each loudspeaker of the one or more loudspeakers to the loudspeaker positions.

19. The interactive toy of clause 17 or 18, where the computing device further determines, for each additional loudspeaker of one or more additional loudspeakers in the listening environment, an additional loudspeaker position, and for each additional loudspeaker of the one or more additional loudspeakers computes an additional distance between the object position and the additional loudspeaker position, generates an additional modified audio signal, wherein an amplitude of the additional modified audio signal is based on (i) the audio signal, (ii) the additional distance, and (iii) the distance attenuation function, and transmits the additional modified audio signal to the additional loudspeaker.

20. The interactive toy of any of clauses 17-19, where the distance attenuation function comprises at least one of: a linear function, a linear-squared function, or an inverse function.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:

determining a loudspeaker position of a loudspeaker in a listening environment;

tracking an object position of an object within the listening environment, wherein the object is an interactive toy;

retrieving, from the object, an audio signal from a sound profile included in the object;

computing a distance between the object position and the loudspeaker position, generating a modified audio signal, wherein an amplitude of the modified audio signal is based on (i) the audio signal, (ii) the distance, and (iii) a distance attenuation function; and transmitting the modified audio signal to the loudspeaker.

2. The computer-implemented method of claim 1, wherein determining the loudspeaker position for the loudspeaker comprises tracking the loudspeaker.

3. The computer-implemented method of claim 1, wherein the distance attenuation function comprises at least one of: a linear function, a linear-squared function, or an inverse function.

4. The computer-implemented method of claim 1, wherein:

the loudspeaker position includes a location and an orientation; and the amplitude of the modified audio signal is further based on the orientation of the loudspeaker relative to the object.

5. The computer-implemented method of claim 1, further comprising:

determining, for each additional loudspeaker of one or more additional loudspeakers in the listening environment, an additional loudspeaker position; and for each additional loudspeaker of the one or more additional loudspeakers:

computing an additional distance between the object position and the additional loudspeaker position, generating an additional modified audio signal, wherein an amplitude of the additional modified audio signal is based on (i) the audio signal, (ii) the additional distance, and (iii) the distance attenuation function; and transmitting the additional modified audio signal to the additional loudspeaker.

6. The computer-implemented method of claim 1, wherein the loudspeaker is a speaker array.

7. One or more non-transitory computer-readable media storing instructions that, when executed by one or more processors, cause the one or more processors to perform the steps of:

determining a loudspeaker position of a loudspeaker in a listening environment;

tracking an object position of an object within the listening environment, wherein the object is an interactive toy;

retrieving, from the object, an audio signal from a sound profile included in the object;

computing a distance between the object position and the loudspeaker position, generating a modified audio signal, wherein an amplitude of the modified audio signal is based on (i) the audio signal, (ii) the distance, and (iii) a distance attenuation function; and transmitting the modified audio signal to the loudspeaker.

8. The one or more non-transitory computer-readable media of claim 7, further comprising:

generating, in a virtual environment corresponding to the listening environment, one or more virtual microphones, wherein:

each virtual microphone corresponds to a loudspeaker of the one or more loudspeakers, and each virtual microphone is at a microphone position within the virtual environment corresponding to the loudspeaker position within the listening environment.

9. The one or more non-transitory computer-readable media of claim 8, wherein the object is a virtual object within the virtual environment.

10. The one or more non-transitory computer-readable media of claim 7, wherein determining the loudspeaker position for the loudspeaker comprises tracking the loudspeaker.

11. The one or more non-transitory computer-readable media of claim 7, wherein:

the loudspeaker position includes a location and an orientation, and the amplitude of the modified audio signal is further based on the orientation of the loudspeaker relative to the object.

12. An interactive toy that generates audio signals for reproduction, comprising:

at least one sensor that acquires sensor data; and a computing device that:

determines a loudspeaker position of a loudspeaker in a listening environment;

tracks, based on the sensor data, an object position for the interactive toy within the listening environment;

retrieves, from the interactive toy, an audio signal from a sound profile included in the interactive toy;

computes a distance between the object position and the loudspeaker position, generates a modified audio signal, wherein an amplitude of the modified audio signal is based on (i) the audio signal, (ii) the distance, and (iii) a distance attenuation function; and transmits the modified audio signal to the loudspeaker.

13. The interactive toy of claim 12, wherein determining the loudspeaker positions for each loudspeaker of the one or more loudspeakers comprises tracking each loudspeaker of the one or more loudspeakers to the loudspeaker positions.

14. The interactive toy of claim 12, wherein the computing device further:

determines, for each additional loudspeaker of one or more additional loudspeakers in the listening environment, an additional loudspeaker position; and for each additional loudspeaker of the one or more additional loudspeakers:

computes an additional distance between the object position and the additional loudspeaker position, generates an additional modified audio signal, wherein an amplitude of the additional modified audio signal is based on (i) the audio signal, (ii) the additional distance, and (iii) the distance attenuation function; and transmits the additional modified audio signal to the additional loudspeaker.

15. The interactive toy of claim 12, wherein the distance attenuation function comprises at least one of: a linear function, a linear-squared function, or an inverse function.

* * * * *